April 18, 1961     H. D. HERBST     2,980,195
MECHANICAL HOLDING MEANS FOR BATTERIES Filed May 14, 1958     2 Sheets-Sheet 1

*INVENTOR.*
HOWARD D. HERBST
BY
Falvey, Souther & Stoltenberg
ATTORNEYS

*INVENTOR.*
HOWARD D. HERBST

United States Patent Office 2,980,195
Patented Apr. 18, 1961

2,980,195
MECHANICAL HOLDING MEANS FOR BATTERIES

Howard D. Herbst, Vincennes, Ind., assignor to The Electric Auto-Lite Company, Toledo, Ohio, a corporation of Ohio Filed May 14, 1958, Ser. No. 735,317
6 Claims. (Cl. 180—68.5)

This invention relates to battery mounting devices, more particularly to a means for holding the battery of an automotive vehicle in position under the hood.

The invention contemplates the provision of a means cooperating with the battery case which is provided with a ledge near its bottom to hold the battery securely in position under the hood of the automotive vehicle.

It is, therefore, the principal object of this invention to provide a cheap and reliable holddown for a battery mounted in the engine compartment of an automotive vehicle, which cooperates with an outwardly extending ledge on the lower portion of the battery case.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings.

Figure 1:
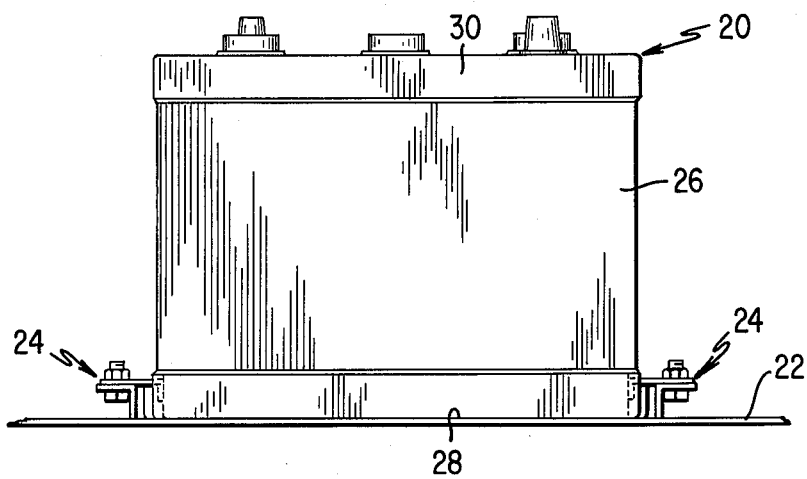
Fig. 1 is an elevational view of a battery to which the invention has been applied.

Referring to Fig. 1 of the drawings, a battery 20 is shown which is affixed to a planar supporting member 22 by a pair of clamping means 24 which incorporate one form of the invention. The container 26 of the battery is preferably of monolithic construction, being made of rubber or asphaltic materials as is well known in the art. The battery container or box is given the usual conformation having four sides, a bottom 28, and a cover 30 with all square corners as shown, and may vary widely in dimensional details depending upon the size of the battery or to the use to which it is applied. In general, the walls of the box or container are quite thick to give them mechanical strength, particularly if the box is to house a battery of the lead-acid type which is very heavy for its size and presents a serious problem to an automobile manufacturer when they must be securely mounted in operative position under the hood of an automotive vehicle. Then there is also the ever present problem of cost and reliability to be considered.

Figures 2, 3:
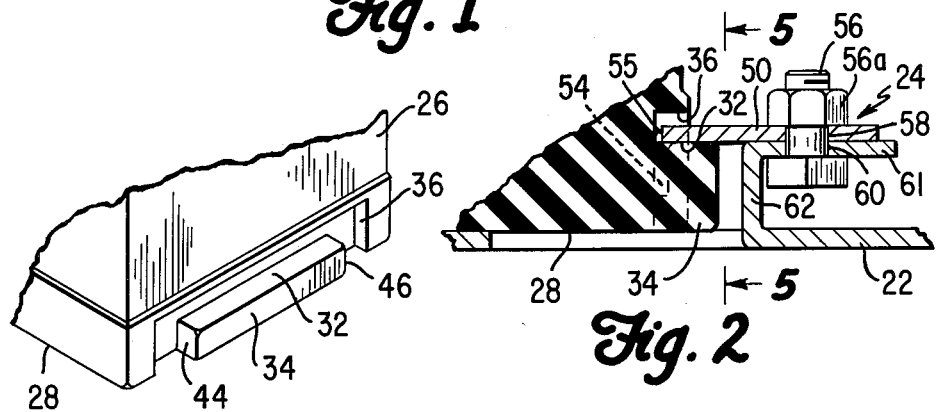
Fig. 2 is a sectional elevation of the holding means shown in Fig. 1.
Fig. 3 is an isometric view of an end portion of the battery case at which the holding means shown in Fig. 2 cooperates with the case.
Figures 10, 11, 12:
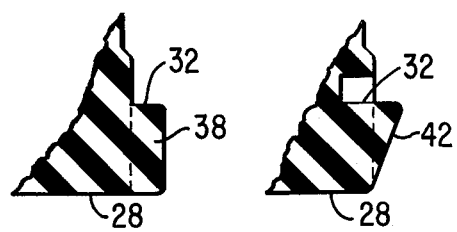
Figs. 10, 11 and 12 are sectional elevations of different forms of the ledge conformation on the battery container used in connection with the invention.

The clamping means 24 comprises a ledge portion 32 (Fig. 2) formed on the upper surface of a projection 34 integral with the container side wall adjacent the bottom 28. The ledge 32 may be formed as a portion of an indented slot 36, as shown in Fig. 2, or as an outwardly extending projection 38 (Fig. 12) completely outside of the exterior lines of the box. In Fig. 11, the ledge is formed solely by an indented slot 40, while, in Fig. 10, the projection is given a wedge shape 42, which gives mechanical strength, and yet saves material in the manufacture of the battery box.

A ledge 32 is formed in each of the opposed ends of the box 26, as is clearly shown in Fig. 1, which provides purchase for each of the clamping means 24 to hold the box securely in position on the surface 22. The ledge 32 is preferably horizontally disposed, although it may also be inclined with reference to the base 22 if such form is convenient or desirable.

In order to prevent lateral movement, transverse of the longitudinal dimension of the projection 34, a pair of end faces 44 and 46 are provided at the ends of the projection 34 as is best seen in Fig. 3. The indented slot 36 also extends downwardly in parallel relation to these end faces as is clearly shown in the figure. Similar end faces, having the same function, are also provided with the projections shown in Figs. 10, 11, and 12.

Figure 5:
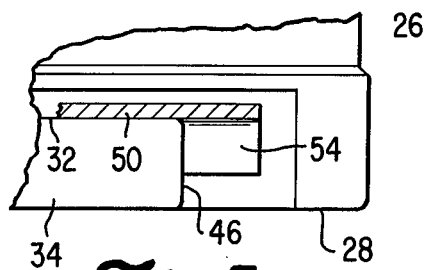
Fig. 5 is an end elevational view, partly in section, taken along the lines 5—5 of Fig. 2.

The clamping means 24 shown in Figs. 1, 2, 4 and 5 comprises a main bridging member 50, preferably made of a stiff metal plate given a treatment to make it resistant to the corrosive action of the acid electrolyte. The member 50 overlies the ledge 32 and is provided with a pair of depending ears 52 and 54 integral with the front edge 55 which cooperate with the end faces 44 and 46 as is best seen in Figs. 5 and 2 to prevent movement of the box 26 in any direction on the supporting plate 22 when affixed to the plate by a bolt 56 cooperating with an aperture 58 in the member 50, and an aligning aperture 60, in the horizontal element 61 of a struck-up angle piece 62 integral with the plate 22 as is best seen in Fig. 2. When the nut 56a is drawn up tight, the member 50 applies pressure on the ledge 32 to firmly press the base 28 of the container 26 against the supporting plate 22.

Figure 7:
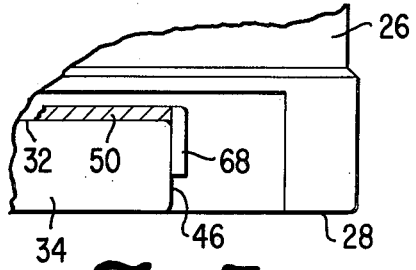
Fig. 7 is an end elevational view similar to Fig. 5 excepting that the clamping member shown in Fig. 6 is used.
Figure 6:
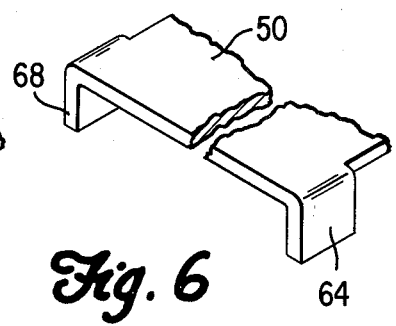
Fig. 6 is an isometric view of another form of the clamping member.

In Figs. 6 and 7, another form of the member 50 is shown, where the depending ears 64 and 68 are formed on the sides of the member 50, to perform the same function as the depending ears 52 and 54 as already described with reference to Figs. 4 and 5. The cooperating relation of this form with the projection 34 and its end face 46 is shown in Fig. 7. Otherwise, this form of member 50 is the same in its relation to the parts as the form already described.

Figure 4:
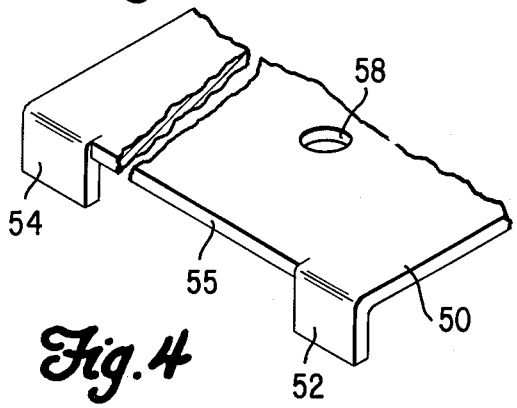
Fig. 4 is an isometric view of the clamping member used in connection with the construction shown in Figs. 2 and 3.
Figure 8:
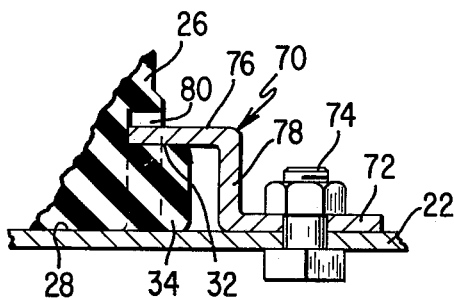
Fig. 8 is a sectional elevation of another form of clamping member.

In Fig. 8, the clamping means comprises a double armed angle member 70, which has one arm 72 bolted to the supporting member 22 by a bolt 74, while the second arm 76 substantially parallel thereto cooperates with the ledge 32, being provided with depending ears of either type shown in Figs. 4 and 6 as convenient or desirable. The connecting web portion 78 is disposed in substantially vertical relation between the two horizontal arms 72 and 76. Or, if desired, the arm 76 may have its ends cooperate with the terminating walls of the slot 80, into which it extends in a close fit.

Figure 9:
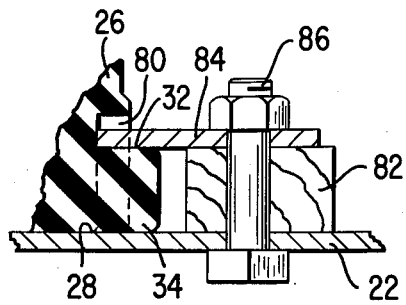
Fig. 9 is a sectional elevation of still another form of the invention.

In Fig. 9, a block of wood 82 or other cheap material forms a buttress for a clamping plate 84, which may be similar to the member 50, or the arm 76, both already described. A bolt 86 affixes the block 82 and the plate 84 to the supporting member 22 as shown to accomplish the same purpose.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. A molded battery box of monolithic construction having at least four sides and a bottom, a substantially horizontally disposed ledge formed on opposed sides adjacent the bottom of the box and having a top transverse face and substantially vertically disposed end faces, removable clamping means therefor including a transversely disposed plate for engaging the top face of said ledge to prevent vertical movement of said box and spaced downwardly disposed elements carried by said plate for engaging the end faces of said ledge to prevent transverse movement of said box, to thereby securely retain said box on a horizontal supporting surface, and means for mounting said clamping means on said supporting surface.

2. A battery box defined in claim 1 further characterized by having the ledge at least partially indented into the outer surface of the box side.

3. A battery box defined in claim 1 further characterized by having the ledge positioned exteriorly of the outer surface of the box side.

4. A battery box defined in claim 1 further characterized by having the ledge formed by the base of a downwardly tapered portion on the exterior of the box side.

5. The combination set forth in claim 1 further characterized by having the clamping means attached to an integral raised portion on the supporting surface.

6. The combination defined in claim 1 further characterized by having the clamping means attached to the supporting surface by a separate element whose upper surface is at the approximate level of the ledge.

References Cited in the file of this patent
UNITED STATES PATENTS

| | | |
|---|---|---|
| 2,225,592 | MacFadden | Dec. 17, 1940 |
| 2,627,385 | Tinnerman | Feb. 3, 1953 |
| 2,817,409 | Cullman | Dec. 24, 1957 |

FOREIGN PATENTS

| | | |
|---|---|---|
| 617,869 | France | Nov. 29, 1926 |